Feb. 17, 1970  W. H. DUMBAUGH, JR  3,496,401
GLASS ENVELOPES FOR IODINE CYCLE INCANDESCENT LAMPS
Filed Dec. 30, 1965

INVENTOR.
William H. Dumbaugh, Jr.
BY
Gerhard K. Adam
ATTORNEY

United States Patent Office 3,496,401
Patented Feb. 17, 1970

3,496,401
GLASS ENVELOPES FOR IODINE CYCLE
INCANDESCENT LAMPS
William H. Dumbaugh, Jr., Corning, N.Y., assignor to
Corning Glass Works, Corning, N.Y., a corporation
of New York
Filed Dec. 30, 1965, Ser. No. 517,715
Int. Cl. H01k 1/28, 1/50, 7/00
U.S. Cl. 313—221          5 Claims

ABSTRACT OF THE DISCLOSURE

An incandescent lamp that employs iodine in a regenerative process to redeposit evaporated tungsten on a tungsten filament wherein the lamp has an envelope consisting essentially of alkaline earth metal oxide aluminosilicate glass composition containing a maximum of 0.10 percent by weight of alkali metal oxide, and upon incandescence of the filament the envelope reaches an operating temperature of 500°–700° C.

---

Figure 1:
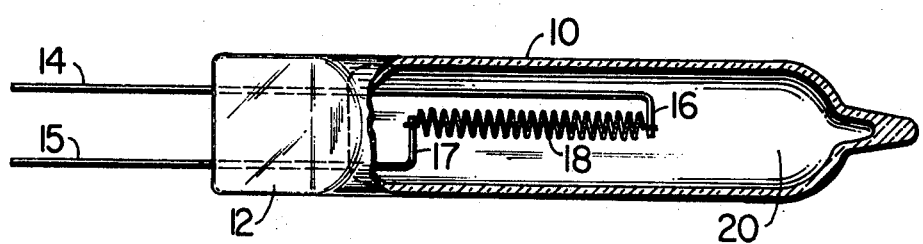

This invention relates to incandescent lamps, and more particularly to hard glass envelopes for making tungsten-iodine lamps.

The development of the quartz-iodine-tungsten lamps was a big step forward in incandescent lamp technology. This improvement in lamp efficiency was made possible through chemically controlling the effects of tungsten evaporation by preventing bulb blackening. Advantages of the new lamp are numerous. The very small size, about one hundredth of the size of a regular lamp, of the quartz-iodine lamp permits new lighting uses where space is restricted. The excellent lumen maintenance, approximately 100 percent, of both light intensity and current provides the consistent performance as required by photometric and optical devices. Moreover, the much longer life which can be achieved for a given efficiency leads to considerable cost savings where lamps are installed in relatively inaccessible places and replacement costs are high.

In order to appreciate my invention, it is necessary to understand briefly the theory and operation of the quartz-iodine lamp which have already been well documented in the literature. In general, molecular iodine is used in the incandescent lamp to prevent blackening and enhance bulb life by redepositing evaporated tungsten on the filament. During the operation of the incandescent lamp, tungsten is transferred from the filament to the wall by normal evaporation and diffusion. The molecular iodine initially added to the lamp is converted, in the vicinity of the filament, by pyrolysis to iodine atoms which diffuse to the envelope wall. Under proper conditions, the iodine atoms react with the adsorbed tungsten to form tungsten iodide which being volatile diffuses to the filament. The tungsten iodide is then decomposed at the filament, resulting in the deposition of the tungsten on the filament and the production of iodine atoms, which thereafter again diffuse to the envelope wall and the cycle is repeated. The mechanism and conditions for regenerative action of the tungsten-iodine cycle is dependent upon iodine-molecular dissociation and the formation and decomposition of tungsten iodide.

Heretofore the envelopes or bulbs for tungsten-iodine lamps were made of quartz or other essentially fused silica composition for instance one which contains about 96% silica as sold under the trademark Vycor. These high temperature resistant materials were thought to be necessary since, in order for the iodine to properly perform its function when the lamp is operating, the inside wall of the envelope has to be maintained at a temperature of at least 250° C. and up to about 1,200° C. Tungsten-iodine lamps have been successfully made from these materials and have been sold commercially. However, quartz and 96% silica glass are difficult to lamp work and require special sealing techniques to introduce the lead wires into the lamps because of their low coefficients of expansion, and thus leave something to be desired from an economic standpoint.

Attempts to reduce lamp costs by substituting commercially available hard glasses, such as borosilicate glasses and aluminosilicate glasses were not successful. While in some cases the glass was too soft such that upon heating the glass envelope bulged and deformed, a primary problem was the appearance of a white coating on the inside surface of the lamp envelope after the lamp had been in operation for some time usually resulting in failure of the lamp. Identification of the coating was difficult because only relatively small amounts were present and the coating apparently disappeared when the seal of the bulb was broken.

It is therefore an object of the present invention to provide a tungsten-iodine lamp made with a hard glass envelope.

It is a further object of the present invention to provide a hard glass composition for a tungsten-iodine lamp envelope which will not be subject to formation of a white coating while the lamp is in operation.

Unexpectedly, I have found a hard glass composition which can readily be formed and made into envelopes for tungsten-iodine lamps without the formation of a white coating during operation of the lamp. The glass compositions from which the envelopes can be made are in the aluminosilicate glass system. I have found that in order to prevent the formation of the white coating, the aluminosilicate glasses must be essentially completely free of alkali metal oxides. These glasses while not as hard as quartz and 96% silica glass are less expensive to manufacture and are far superior in their lamp working properties. Moreover, the aluminosilicate glasses of this invention have coefficients of expansion compatible with tungsten and Kovar (an alloy of 28% nickel, 18% copper, and 53% iron) and can be sealed directly to these metal leads.

In accordance with the present invention, I have discovered a hard glass envelope for an iodine cycle lamp which under operating conditions is capable of withstanding a wall temperature of more than 500° C. without deformation and which glass envelope is comprised essentially of an alkaline earth metal oxide aluminosilicate glass containing a maximum of 0.10% by weight of alkali metal oxide and having a strain point of at least the envelope wall temperature.

Figure 2:
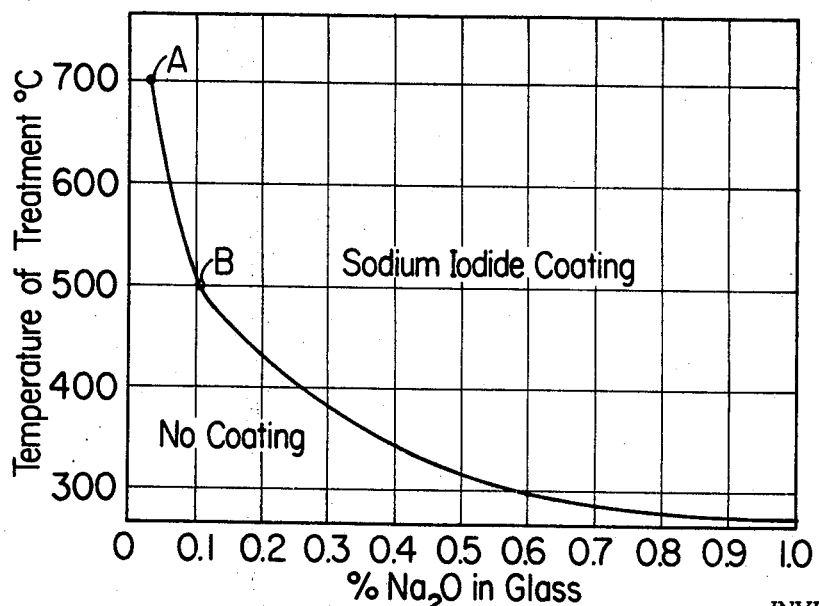

The invention is more clearly understood from the following description taken in conjunction with the accompanying drawing in which:

FIGURE 1 illustrates a typical iodine cycle lamp prepared according to the present invention; and FIGURE 2 is a graphic representation of the coating formation as a function of sodium oxide content and temperature in simulated iodine cycle lamps made from the aluminosilicate glass compositions described herein.

Referring to FIGURE 1, a typical iodine cycle lamp is prepared from an aluminosilicate glass tube which is shaped to form a glass envelope 10. Two tungsten lead wires 14 and 15 are placed within the glass envelope 10 with a portion of the lead wires forming the supports 16 and 17 to which is attached a tungsten filament 18 of the coiled-coil type. Preferably the tungsten filament 18 is concentrically located within the glass envelope 10. The interior portion 20 of the envelope is then evacuated and filled with argon and traces of iodine vapor and hermetic seal 12 is formed around the lead wires 14 and 15.

The lamp normally operates at very high temperatures and consequently the glass envelope must be designed such that the walls are capable of withstanding temperatures in excess of 250° C. and usually in the range of 500–700° C. The maximum use temperature of the envelope walls is determined by the ability of the glass to withstand distortion. For purposes of convenience, this is given in terms of the strain point of the glass which properly should be at least as high as the envelope wall temperature. The strain point of the glass is considered as the temperature at which the internal stress is substantially relieved and corresponds to a viscosity of $10^{14.50}$ poises when measured by ASTM Method Designation C336.

In designing an aluminosilicate envelope for the iodine cycle lamp, the following criteria are used. The glass composition should be an alkaline earth metal oxide aluminosilicate glass containing not more than 0.10% by weight alkali metal oxide. The strain point should be at least equal to or greater than 500° C. such that no deformation of the envelope occurs at the operating temperatures. The glass composition must be matched in expansion to tungsten and Kovar to permit direct sealing and preferably should have an expansion coefficient in the range of $30-50 \times 10^{-7}/°$ C. Further, the viscosity of the glass at the liquidus should be such as to permit tube drawing, i.e., at least 5,000 poises.

Aluminosilicate glasses known heretofore are briefly discussed by E. B. Shand, "Glass Engineering Handbook", 7, McGraw-Hill, New York, 1958. These contain 20% or more of alumina, small amounts of calcium oxide or magnesium oxide, and sometimes relatively small amounts of boric oxide as a flux, but very limited amounts of soda or potash. They are usually more difficult to melt and to work than the borosilicate glasses. They are characterized by high softening temperatures and relatively low coefficients of expansion which make them particularly suitable for high temperature uses.

The unique and unexpected feature which I have discovered in applying aluminosilicate glasses for envelopes and iodine-tungsten lamps is that the glass must be substantially alkali free. Referring to FIGURE 2 of the drawing, it is readily apparent that the formation of a sodium iodide coating in the inner surface of the glass envelope is a function not only of the alkali concentration of the glass but also a function of the temperature of the envelope wall. Thus, in order to avoid the formation of the white coating and consequently lamp failure, for each temperature there is a corresponding maximum alkali concentration and that as the temperature is increased, the corresponding alkali concentration must be decreased. It is mentioned above that the lamp using the aluminosilicate glass envelope of the present invention usually operates at a wall temperature of between 500–700° C. and as is shown in the graph, this corresponds to the portion of the curve between point A and point B. Since point B (500° C.) is considered to be at the lower end of the operating temperature of the lamp envelope, the concentration of soda in the corresponding glass must not exceed 0.10% to prevent the formation of the white coating. This amount of soda is the maximum alkali contamination permitted in the aluminosilicate glass of the present invention. It is also apparent from the graph that at point A (700° C.) only about 0.03% by weight of soda can be tolerated in the glass. Thus, no white coatings will be formed in glass envelopes containing a maximum amount of alkali and operating at a corresponding wall temperature as designated by that portion of the graph which is to the left of the segment AB as shown in FIGURE 2.

The data for FIGURE 2 was obtained from simulated iodine cycle lamps. Initially, attempts were made to simulate conditions of the iodine cycle lamp without actually making lamps. Aluminosilicate glass tubes, analyzed for alkali content, were evacuated and filled with argon, after which a small amount of iodine was placed in the tube and the tube was sealed. The tubes were then placed into a furnace and heated for a period of 100 hours at various temperatures up to 700° C. No white deposit was observed on the inner surface of the envelope. It was, therefore, apparent that the iodine vapor had not reacted with the alkali on the surface of the glass. A second group of tubes were prepared similar to those of the first group with the exception that small amounts of tungsten powder were also placed into the tubes together with the iodine. Upon heating the tubes it was generally observed that the tubes containing alkali were coated with a white deposit and those which were substantially alkali free contained no white deposits. It is, therefore, assumed that the tungsten plays a vital role in the development of the white coating in alkali contaminated aluminosilicate glass envelopes.

As I have mentioned above, the aluminosilicate glasses useful in the present invention must be substantially alkali free. In general, aluminosilicate glasses, even those to which no alkali has been intentionally added, contain sufficient alkali-containing contaminants to make them inoperative for tungsten-iodine cycle lamp envelopes. It is, therefore, necessary that only pure batch materials, which are substantially alkali free or which have very low alkali content be used in making the aluminosilicate glasses of the invention. A primary source of alkali contamination is found in the silica and alumina used in the raw batch. Pure batch materials containing very low alkali are available commercially, and, for example, low alkali sand (0.03% alkali) is sold by the Pennsylvania Glass Sand Corp. as "Morgan 200 Mesh Sand" and a low alkali alumina (0.02% alkali) is sold commercially as "Alcoa T-61 Tabular Alumina." The alkaline earth metal oxides used in the glass formulation may be obtained in reasonable high purity containing substantially no alkali and when very high purity is desired analytical reagent or chemically pure grades should be used. However, dolomitic limestone as a source of calcium and magnesium carbonates is too highly contaminated by alkali and is not recommended.

The glasses which meet the above cited criteria for envelopes for iodine cycle lamps are prepared from alkaline earth metal aluminosilicate glass compositions. These glasses consist essentially on the oxide basis as calculated from the batch of 55–70% by weight of silica, 13–25% by weight of alumina, and 10–25% by weight of alkaline earth metal oxide. The term alkaline earth metal oxide as used herein includes magnesium oxide, calcium oxide, strontium oxide, and barium oxide, and mixtures thereof. Optionally the glass composition may also contain from 0–10% by weight of boric oxide.

A preferred glass composition from which aluminosilicate glass envelopes can be made for iodine cycle lamps as set forth in the present invention contains the following formulation:

| Ingredient: | Weight percent |
| --- | --- |
| Silica | 68.4 |
| Alumina | 19.2 |
| Calcium oxide | 7.84 |
| Barium oxide | 4.59 |
| Soda | <0.05 |

My invention is further illustrated by the following examples:

EXAMPLE I

The preferred glass composition of the present invention was prepared and melted from the following formulation:

| Batch material: | Weight (grams) |
|---|---|
| Morgan 200 mesh sand | 890.3 |
| Alcoa T-61 tabular alumina | 250.6 |
| CP calcium carbonate | 182.7 |
| Barium hydrate | 114.9 |

The composition of the glass in terms of the oxides content is that set forth hereinabove. Upon analysis for alkali content, it was foud that the glass contained 0.03% by weight of soda.

The glass composition was then tested using standard techniques to determine its characteristics. The properties of the glass are as follows:

| | |
|---|---|
| Expansion (0°–300° C.)×$10^{-7}$/° C. | 33.5 |
| Softening point, ° C. | 1130 |
| Annealing point, ° C. | 876 |
| Strain point, ° C. | 825 |
| Density g./cm.$^3$ | 2.483 |
| Viscosity at liquidus, poises | 1×$10^4$ |

The glass composition was then drawn into half-inch diameter tubing. A portion of the tubing two inches in length, was then used to make a tungsten-iodine cycle lamp as shown in FIGURE 1. It was found that after the lamp had been in operation for some time, no white coating developed on the envelope wall. Other portions of the tubing were used in the simulated tungsten-iodine cycle lamps as described hereinbelow.

EXAMPLE II

Another glass composition which falls within the scope of the present invention was prepared from the following formulation:

| Batch material: | Weight (grams) |
|---|---|
| Morgan 200 mesh sand | 762.7 |
| Alcoa T-61 tabular alumina | 197.3 |
| Boric acid | 93.4 |
| Calcined magnesia | 90.7 |
| CP calcium carbonate | 234.8 |
| Barium hydrate | 58.8 |
| Barium nitrate | 44.8 |
| Arsenic trioxide | 6.6 |

The composition of the glass in weight percent on the oxide basis and the properties of the glass are as follows:

| | |
|---|---|
| $SiO_2$ | percent 58.0 |
| $Al_2O_3$ | do 15.0 |
| CaO | do 10.0 |
| MgO | do 6.9 |
| BaO | do 6.0 |
| $B_2O_3$ | do 4.0 |
| Expansion (0°–300° C.)×$10^{-7}$/° C. | 46 |
| Softening point, ° C. | 910 |
| Annealing point, ° C. | 712 |
| Strain point, ° C. | 665 |
| Density g./cm.$^3$ | 2.63 |
| Viscosity at liquidus, poises | 3.8×$10^4$ |

The glass composition was analyzed for alkali content and it was found that the glass contained 0.05% by weight of soda. This composition was thereafter modified to increase the alkali content whereby samples were prepared containing soda ranging from 0.11 to 0.96% by weight. These glasses were then drawn into a half inch diameter tubing and prepared for the tests described below.

EXAMPLE III

The tubing prepared in Examples I and II were now tested in simulated iodine cycle lamps. Samples from the various tubing were prepared by cutting the tubing into two inch lengths and sealing the tubing at one end. The tubing was then evacuated and small amounts of iodine crystals and tungsten powder were introduced. Argon was placed in one end and the other end of the tube was sealed. The tube was then placed in a furnace and heat treatment at the temperature shown below for a period of 100 hours. The tube was cooled and removed from the furnace and the inside surface of the tube was inspected for the presence of a white deposit.

Using the glasses having the same oxide content as those prepared in Example I and Example II with the exception that the alkali content in percent by weight was varied as shown, the temperature at which the glasses were heated in the furnace, and the observations are set forth in the table below:

| Sample | Glass | Na$_2$O | K$_2$O | Li$_2$O | Treatment | Coating |
|---|---|---|---|---|---|---|
| A | Ex. I | 0.03 | 0.00 | 0.00 | 700° C.—100 hrs | None. |
| B | Ex. II | 0.05 | 0.006 | 0.00 | 700° C.—100 hrs | Very light. |
| C | Ex. II | 0.11 | 0.008 | 0.006 | 700° C.—100 hrs | Medium. |
| D | Ex. II | 0.16 | 0.009 | 0.00 | 700° C.—100 hrs | Do. |
| E | Ex. II | 0.53 | 0.009 | 0.00 | 700° C.—100 hrs | Med.-heavy. |
| F | Ex. II | 0.96 | 0.01 | 0.00 | 700° C.—100 hrs | Heavy. |
| G | Ex. I | 0.03 | 0.00 | 0.00 | 600° C.—100 hrs | None. |
| H | Ex. II | 0.05 | 0.006 | 0.00 | 600° C.—100 hrs | Do. |
| I | Ex. II | 0.11 | 0.008 | 0.006 | 600° C.—100 hrs | Medium. |
| J | Ex. II | 0.16 | 0.009 | 0.00 | 600° C.—100 hrs | Do. |
| K | Ex. II | 0.53 | 0.009 | 0.00 | 600° C.—100 hrs | Med.-heavy. |
| L | Ex. II | 0.96 | 0.01 | 0.00 | 600° C.—100 hrs | Heavy. |
| M | Ex. II | 0.05 | 0.006 | 0.00 | 550° C.—100 hrs | None. |
| N | Ex. II | 0.16 | 0.009 | 0.00 | 550° C.—100 hrs | Medium. |
| O | Ex. II | 0.05 | 0.006 | 0.00 | 500° C.—100 hrs | None. |
| P | Ex. II | 0.11 | 0.008 | 0.006 | 500° C.—100 hrs | Very light. |
| Q | Ex. II | 0.16 | 0.009 | 0.00 | 500° C.—100 hrs | Medium. |
| R | Ex. II | 0.53 | 0.009 | 0.00 | 500° C.—100 hrs | Do. |
| S | Ex. II | 0.96 | 0.01 | 0.00 | 500° C.—100 hrs | Do. |
| T | Ex. II | 0.16 | 0.009 | 0.00 | 450° C.—100 hrs | None. |
| U | Ex. II | 0.53 | 0.009 | 0.00 | 450° C.—100 hrs | Medium. |
| V | Ex. II | 0.16 | 0.009 | 0.00 | 400° C.—100 hrs | None. |
| W | Ex. II | 0.53 | 0.009 | 0.00 | 400° C.—100 hrs | Light. |
| X | Ex. II | 0.96 | 0.01 | 0.00 | 400° C.—100 hrs | Med.-heavy. |
| Y | Ex. II | 0.53 | 0.009 | 0.00 | 300° C.—100 hrs | None. |
| Z | Ex. II | 0.96 | 0.001 | 0.00 | 300° C.—100 hrs | Very light. |

This data was used to plot the curve of FIGURE 2. It is readily apparent that the formation of the white coating depends upon the alkali content and also the temperature of the envelope wall. Since tungsten-iodine lamp has, while in operation, a minimum wall temperature of about 500° C., the alkali content of glass envelope cannot exceed a maximum of about 0.10% by weight.

EXAMPLES IV–VII

Other aluminosilicate glass compositions containing not more than 0.10% by weight of alkali and which are useful in the present invention and the properties of these glasses are set forth in the table below:

|  | Ex. IV | Ex. V | Ex. VI | Ex. VII |
|---|---|---|---|---|
| Percent: | | | | |
| $SiO_2$ | 56.9 | 66 | 69.4 | 56.6 |
| $Al_2O_3$ | 14.9 | 23 | 19.5 | 14.8 |
| CaO | 11.1 | 11 | 7.96 | 11.9 |
| MgO | 2.98 | | | 8.54 |
| BaO | 7.55 | | | |
| SrO | | | 3.14 | |
| $B_2O_3$ | 5.96 | | | 7.95 |
| Expansion (0°–300° C.)×$10^{-7}$/°C | 45.9 | 35 | 33.4 | 46 |
| Softening Point, °C | 901 | 1,060 | | 883 |
| Annealing Point, °C | 698 | 866 | 870 | 700 |
| Strain Point, °C | 651 | 834 | 817 | 661 |
| Density, g./cm.³ | 2.637 | 2.48 | 2.468 | 2.546 |
| Viscosity at Liquidus, Poises | $1.5 \times 10^5$ | $1 \times 10^4$ | $8.5 \times 10^4$ | $9 \times 10^3$ |

I claim:

1. An incandescent lamp that employs iodine in a regenerative process to redeposit evaporated tungsten on a tungsten filament, said lamp having a glass envelope consisting essentially of an alkaline earth metal oxide aluminosilicate glass composition containing a maximum of 0.10 percent by weight of alkali metal oxide, said envelope reaching an operating temperature of 500°–700° C. upon incandescence of said filament.

2. The incandescent lamp of claim 1, wherein said glass composition consists essentially in weight percent on the oxide basis of 10–25% of alkaline earth metal oxide, 13–25% of alumina, 55–70% of silica, and 0–10% of boric oxide.

3. The incandescent lamp of claim 2, wherein said alkaline earth metal oxide is a member selected from the group consisting of magnesium oxide, calcium oxide, strontium oxide, and barium oxide and mixtures thereof.

4. The incandescent lamp of claim 2, wherein said glass composition contains a maximum amount of alkali metal oxide at a corresponding envelope wall temperature between 500–700° C. as defined by that portion of the graph which is to the left of the segment AB as shown in FIGURE 2.

5. The incandescent lamp of claim 2, wherein said glass composition consists essentially in weight percent on the oxide basis of 68% of silica, 19% of alumina, 8% of calcium oxide, 5% of barium oxide and less than 0.05% of sodium oxide, said glass composition having a viscosity at the liquidus of at least 5,000 poises.

References Cited

UNITED STATES PATENTS 2,961,328   11/1960   Babcock et al. _____ 106—52

JAMES E. POER, Primary Examiner

U.S. Cl. X.R.

106—52, 53; 313—222, 223